Patented Feb. 2, 1937

2,069,404

UNITED STATES PATENT OFFICE 2,069,404

MANUFACTURE OF ALKALI METAL ALCOHOLATES

George Lewis Cunningham, Niagara Falls, N. Y., assignor to The Mathieson Alkali Works, Inc., New York, N. Y., a corporation of Virginia No Drawing. Application August 26, 1936, Serial No. 98,085

4 Claims. (Cl. 260—153)

This invention relates to improvements in the manufacture of alkali metal alcoholates, and more particularly to improvements in the manufacture of alkali metal alcoholates of higher alcohols.

Heretofore the alkali metal alcoholates of higher alcohols have customarily been prepared by one of two general methods, either by reacting an alkali metal as such with the corresponding anhydrous alcohol or by reacting the corresponding anhydrous alcohol with an alkali metal hydroxide. The cost of the alkali metal and the fire and explosion hazards have restricted the commercial use of the first method. Due chiefly to the incomplete character of the reaction, the efficiency and economy of the second method have not been brought to satisfactory levels.

This invention is useful, particularly, in the manufacture of alkali metal alcoholates of monohydric primary, secondary, and tertiary aliphatic alcohols, whether saturated or unsaturated, containing more than four carbon atoms and not more than twenty carbon atoms. This invention is also useful in the manufacture of alkali metal alcoholates of the monohydric cyclic alcohols such as cyclohexanol and the aliphatic-aromatic alcohols such as benzyl alcohol.

I have discovered that alkali metal alcoholates of alcohols containing four or more carbon atoms may advantageously be produced by reacting an alcohol containing not less than four carbon atoms with an alkali metal alcoholate of a lower alcohol containing not more than four carbon atoms. One of the products of this reaction is the anhydrous lower alcohol corresponding to the alcoholate supplied to the reaction as a starting material. This alcohol may then be removed by distillation. The desired product, the alkali metal alcoholate of the higher alcohol, remains in solution in the corresponding higher alcohol.

The reaction of this invention may be typified as follows:

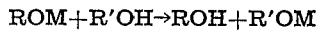

wherein R represents an aliphatic radical containing not more than four carbon atoms, R' represents an aliphatic or cyclic radical containing not less than four nor more than twenty carbon atoms, and M represents an alkali metal. By the use of the above outlined method, I have obtained satisfactory reaction rates and high reaction efficiencies.

It will be apparent from the foregoing that this invention comprehends the production of an alcoholate of butyl alcohol from alcoholates of lower alcohols, for example by reacting sodium methylate with anhydrous butyl alcohol as well as the production of alcoholates of higher alcohols from alcoholates of butyl alcohol.

The alkali metal alcoholate employed in the process of this invention may be produced, with advantage, as described in my copending application Serial Number 65,491, filed February 24, 1936, but it is to be understood that this invention is not limited to the use of alkali metal alcoholates produced in this manner.

In carrying out the process of the present invention, the lower alcohol produced, the alcohol corresponding to the starting alcoholate, after being distilled from the reaction mixture, may with advantage be again converted to the alcoholate for use in the primary reaction and the process thus made cyclic.

The alcoholate of the higher alcohol, as produced, will be in solution in the corresponding higher alcohol. If the dry alcoholate is to be produced, this solvent alcohol may be removed, and may thus be made available for re-use in the process.

The following examples will serve to illustrate specific embodiments of this invention when used in conjunction with the process of my above-mentioned copending application, Serial Number 65,491:

Example I 500 parts of methylalcohol are reacted with a 0.3% Na solution amalgam using a graphite contact electrode until 23 parts of sodium have reacted. 200 parts of secondary amyl alcohol are added to the resulting methyl alcohol solution of sodium methylate after separation from the amalgam. The methyl alcohol is distilled off leaving a solution of sodium amylate in amyl alcohol.

Example II 500 parts of ethyl alcohol are reacted with a 0.7% Na sodium amalgam using a cast iron grid as a contact electrode until 23 parts of sodium have reacted. The ethyl alcohol solution of sodium ethylate is separated from the amalgam. 100 parts of cyclohexanol are added to this alcoholic solution of sodium ethylate and the ethyl alcohol is distilled off. Sodium cyclohexanolate is produced, this product being recovered in solution in cyclohexanol.

I claim:

1. In the manufacture of alkali metal alcoholates, the improvement which comprises reacting an anhydrous alcohol containing not less than four carbon atoms with an alkali metal alcoholate of a lower alcohol containing not more than four carbon atoms and distilling the alcohol containing not more than four carbon atoms from the reaction mixture to form the alkali metal alcoholate corresponding to the original anhydrous alcohol.

2. In the manufacture of alkali metal alcoholates, the improvement which comprises reacting an anhydrous alcohol containing not more than four carbon atoms with an alkali metal amalgam in the presence of an electrically conducting but non-amalgamating electrode in contact with the amalgam and the alcohol, reacting an anhydrous higher alcohol containing not less than four carbon atoms with the resulting alkali metal alcoholate and distilling the alcohol containing not more than four carbon atoms from the reaction mixture to form the alkali metal alcoholate corresponding to the anhydrous higher alcohol.

3. In the manufacture of alkali metal alcoholates, the improvement which comprises cyclically reacting an anhydrous alcohol containing not more than four carbon atoms with an alkali metal amalgam in the presence of an electrically conducting but non-amalgamating electrode in contact with the amalgam and the alcohol, reacting an anhydrous higher alcohol containing not less than four carbon atoms with the resulting alkali metal alcoholate and distilling the alcohol containing not more than four carbon atoms from the reaction mixture to form the alkali metal alcoholate corresponding to the anhydrous higher alcohol.

4. In the manufacture of sodium cyclohexanolate, the improvement which comprises reacting anhydrous ethyl alcohol with sodium amalgam in the presence of an electrically conducting but non-amalgamating electrode in contact with the amalgam and the alcohol, reacting anhydrous cyclohexanol with the resulting sodium ethylate, and distilling ethyl alcohol from the reaction mixture to form sodium cyclohexanolate.

GEORGE LEWIS CUNNINGHAM.

CERTIFICATE OF CORRECTION.

Patent No. 2,069,404. February 2, 1937.

GEORGE LEWIS CUNNINGHAM.

It is hereby certified that error appears in the printed specification of the above numbered patent requiring correction as follows; Page 1, second column, line 32, for the word "solution" read sodium; and that the said Letters Patent should be read with this correction therein that the same may conform to the record of the case in the Patent Office.

Signed and sealed this 23rd day of March, A. D. 1937.

(Seal)

Henry Van Arsdale
Acting Commissioner of Patents.